(12) United States Patent
Lee et al.

(10) Patent No.: US 7,313,275 B2
(45) Date of Patent: Dec. 25, 2007

(54) METHOD OF SEPARATING TEXT AND GRAPHS IN DIGITAL IMAGE DATA

(75) Inventors: Fu-Wen Lee, Taipei (TW); Ching-Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 481 days.

(21) Appl. No.: 11/057,155

(22) Filed: Feb. 15, 2005

(65) Prior Publication Data
US 2006/0182342 A1   Aug. 17, 2006

(51) Int. Cl.
*G06K 9/00* (2006.01)
*G06K 9/34* (2006.01)
*H04N 1/40* (2006.01)
*H04N 1/46* (2006.01)

(52) U.S. Cl. ............... 382/176; 382/164; 382/180; 358/462; 358/538

(58) Field of Classification Search ............ 382/164, 382/176, 180; 358/462, 538
See application file for complete search history.

(56) References Cited

U.S. PATENT DOCUMENTS

| | | | |
|---|---|---|---|
| 4,577,235 A * | 3/1986 | Kannapell et al. .......... | 358/462 |
| 5,379,130 A | 1/1995 | Wang et al. | |
| 5,889,885 A | 3/1999 | Moed et al. | |
| 6,681,053 B1 | 1/2004 | Zhu | |
| 6,690,826 B2 * | 2/2004 | Slavin .................... | 382/192 |
| 6,903,844 B1 * | 6/2005 | Kamiya .................. | 358/2.1 |
| 7,263,223 B2 * | 8/2007 | Irwin ..................... | 382/176 |

FOREIGN PATENT DOCUMENTS

JP   10336441 A   * 12/1998

OTHER PUBLICATIONS

Du et al. ("Automated system for text detection in individual video images," Journal of Electronic Imaging, vol. 12(3), Jul. 2003, pp. 410-422).*
Mital et al. ("Text segmentation for automatic document processing," SPIE vol. 3651, 1999, pp. 30-40).*
Yuan et al. ("Page segmentation and text extraction from gray scale image in microfilm format," SPIE vol. 4307 (2001), pp. 323-331).*

* cited by examiner

*Primary Examiner*—Matthew C. Bella
*Assistant Examiner*—Yubin Hung
(74) *Attorney, Agent, or Firm*—Rabin & Berdo, P.C.

(57) ABSTRACT

A method of separating text and graphs in digital image data is used to separate digital image data into graph data and text data. According to a default separating parameter, the digital image data are partitioned into several operating matrices. One then sets a default crossing reference level for comparison analyses to compare adjacent pixel units in each operating matrix. When the digital characteristic value of a pixel unit is greater than the default crossing reference level and the digital characteristic value of its one adjacent pixel unit are smaller the default crossing reference level, the operating matrix is given a weight. Afterwards, all the weights are added up to give a weighted statistical value, which eventually is used to separate the graph data from the text data.

8 Claims, 7 Drawing Sheets

METHOD OF SEPARATING TEXT AND GRAPHS IN DIGITAL IMAGE DATA

BACKGROUND OF THE INVENTION

1. Field of Invention

The invention relates to an image processing method for digital image data and, in particular, to a method of separating graph data from text data in digital image data.

2. Related Art

In order to obtain a better printing quality or a sharper image effect, digital image data have to be analyzed. A common method is to separate the graph data and the text data in the digital image data. There are many ways to implement the separation of graphs and text in digital image data. Discussions of such techniques can be readily found in journals, academic theses, and patents. For example, the U.S. Pat. No. 5,379,130 (hereinafter as P130), U.S. Pat. No. 5,889,885 (hereinafter as P885), and U.S. Pat. No. 6,681,053 (hereinafter as P053) have disclosed related techniques.

The purpose of the patent P130 is to increase the printing quality of digital image data. This patent uses a 3×3 matrix to process the image. It further employs the edge enhancement and binary separation techniques to achieve the graph-text separation. The patent P885 utilizes a specific algorithm along with many operation thresholds to process images in order to obtain gray-level digital images of a better quality. The patent P053 emphasizes on the color presentation on LCD and PDP displays. It improves the horizontal resolution in the color matrix display. In this case, a matrix of a special size is used in company with table-looking operations and several operation thresholds.

Although the above-mentioned cases can separate graph and text data in a digital image with a reasonably good effect, it is not difficult to realize that they all involve complicated processes, many algorithms or table-looking. Therefore, they require a lot of operating time of the computer or the use of a processing chip with good performance. They thus suffer from the drawback of higher hardware costs.

SUMMARY OF THE INVENTION

In view of the foregoing, the invention provides a method of separating graphs and text in digital image data. The invention employs a simpler procedure and algorithm to speed up the operations. Therefore, it greatly lowers the cost of the processing chip.

The disclosed method is used for digital image data composed of graph and text data. The invention proposes a simpler and faster graph-text separation technique to separate the graph data and the text data contained in a digital image.

The disclosed method first obtains digital image data and then partitions the digital image data according to a predetermined division parameter into several operating matrices. Each of the operating matrices consists of several pixel units, each of which contains a digital characteristic value. Afterwards, a crossing reference level (CRL) is set for comparison analyses. The comparison analysis compares adjacent pixel units according to the default CRL. When the digital characteristic value of a pixel unit is greater than the default CRL and the digital characteristic value of its one adjacent pixel unit is smaller than the default CRL, the operating matrix is given a weight. When the digital characteristic value of the pixel unit is smaller than the default CRP and the digital characteristic value of its one adjacent pixel unit are greater than the default CRL, the operating matrix is also given a weight. Afterwards, the weights of the operating matrices are added to give a weighted statistical value. Given a separating reference level (SRL), an operating matrix is defined as graph data when the weighted statistical value is smaller than the SRL and as text data when the weighted statistical value is greater than the SRL. After going through the above-mentioned procedure, the graph data and the text data in the digital image can be separated.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

We refer to FIGS. 1 to 7 to explain the procedure in the disclosed method of graph-text separation in digital image data. The method first read in digital image data provided by an electronic device such as a computer system, a printer, or a scanner (step 100). The digital image data are then partitioned into several operating matrices according to a default separating parameter (step 101). Each operating matrix consists of n×n pixel units, each of which contains X and Y coordinates. Moreover, each pixel unit has a digital characteristic value (DCV), which may be the level of gray, the RGB values, and the color saturation. In other words, the DCV gives the pixel characteristic of a pixel unit.

After step 101, one sets a default crossing reference level (CRL) (step 102) for performing a comparison analysis. The comparison analysis is done for adjacent two pixel units in the X direction or Y direction of the operating matrix. That is, we take two adjacent pixel units in the operating matrix as one entry and process them individually.

Figure 1:
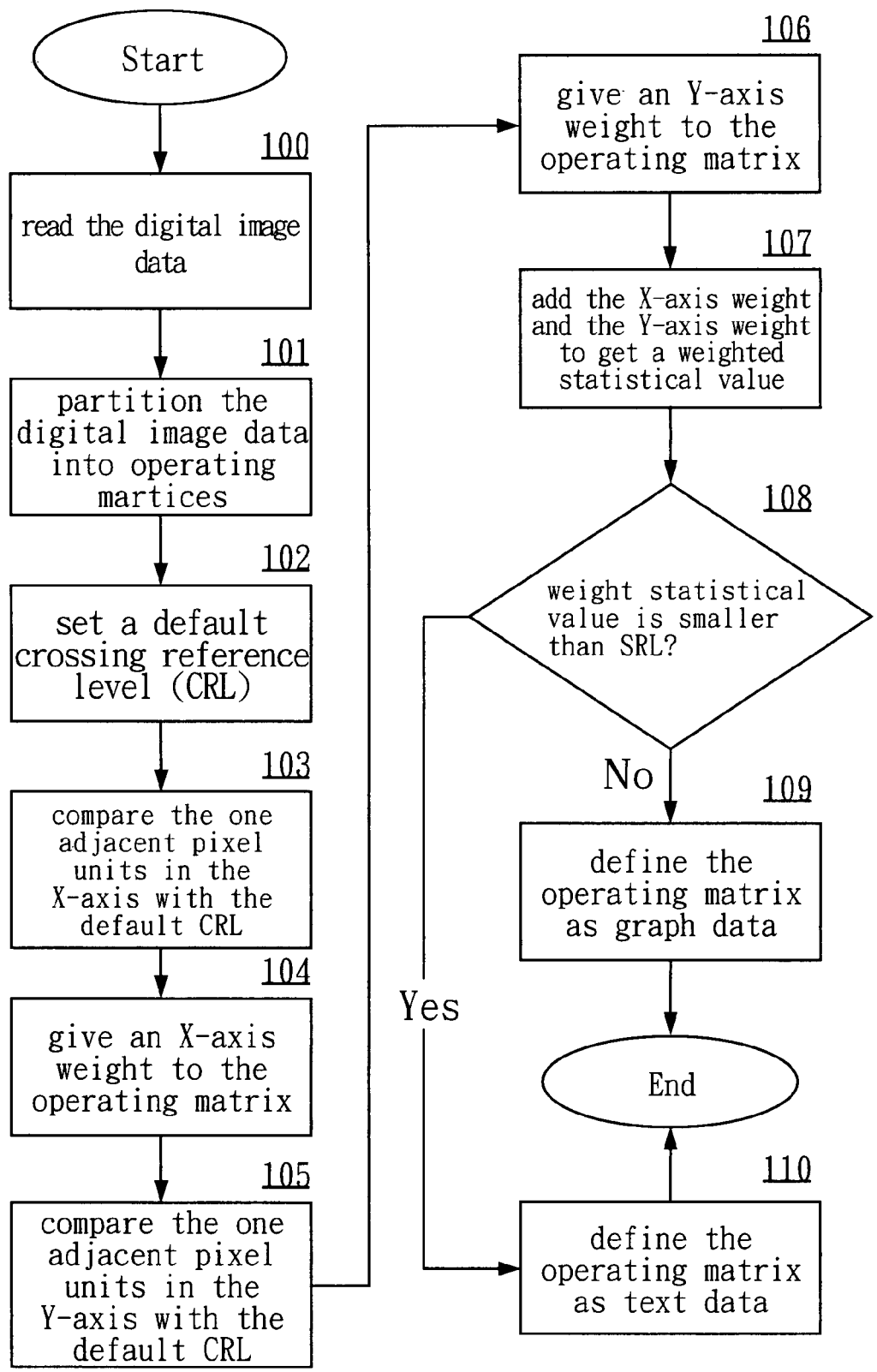
FIG. 1 is a process flowchart of the disclosed method of separating text and graphs in digital image data.
Figure 2:
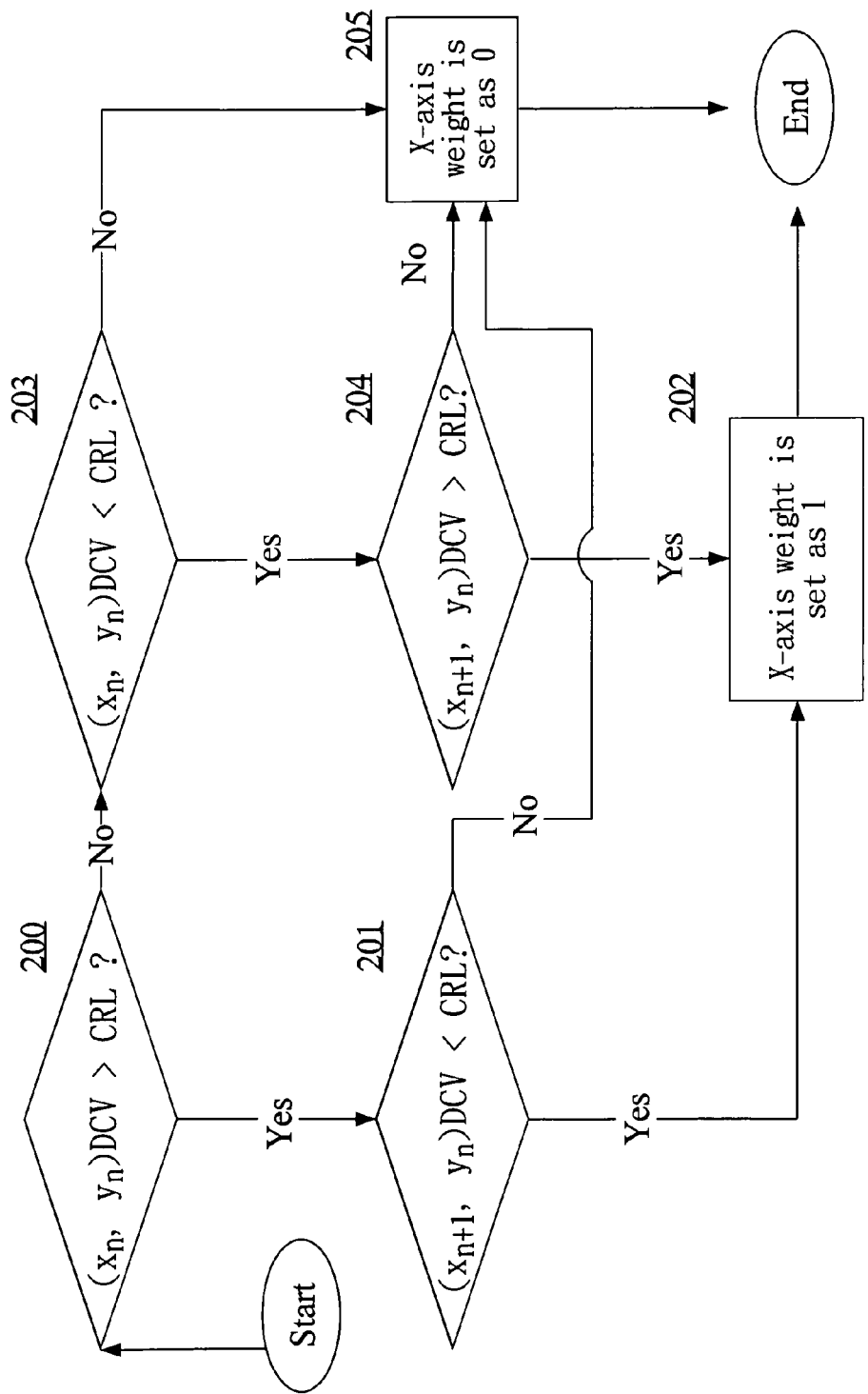
FIG. 2 is a flowchart of the X-axis comparison analysis in the disclosed method.
Figure 3:
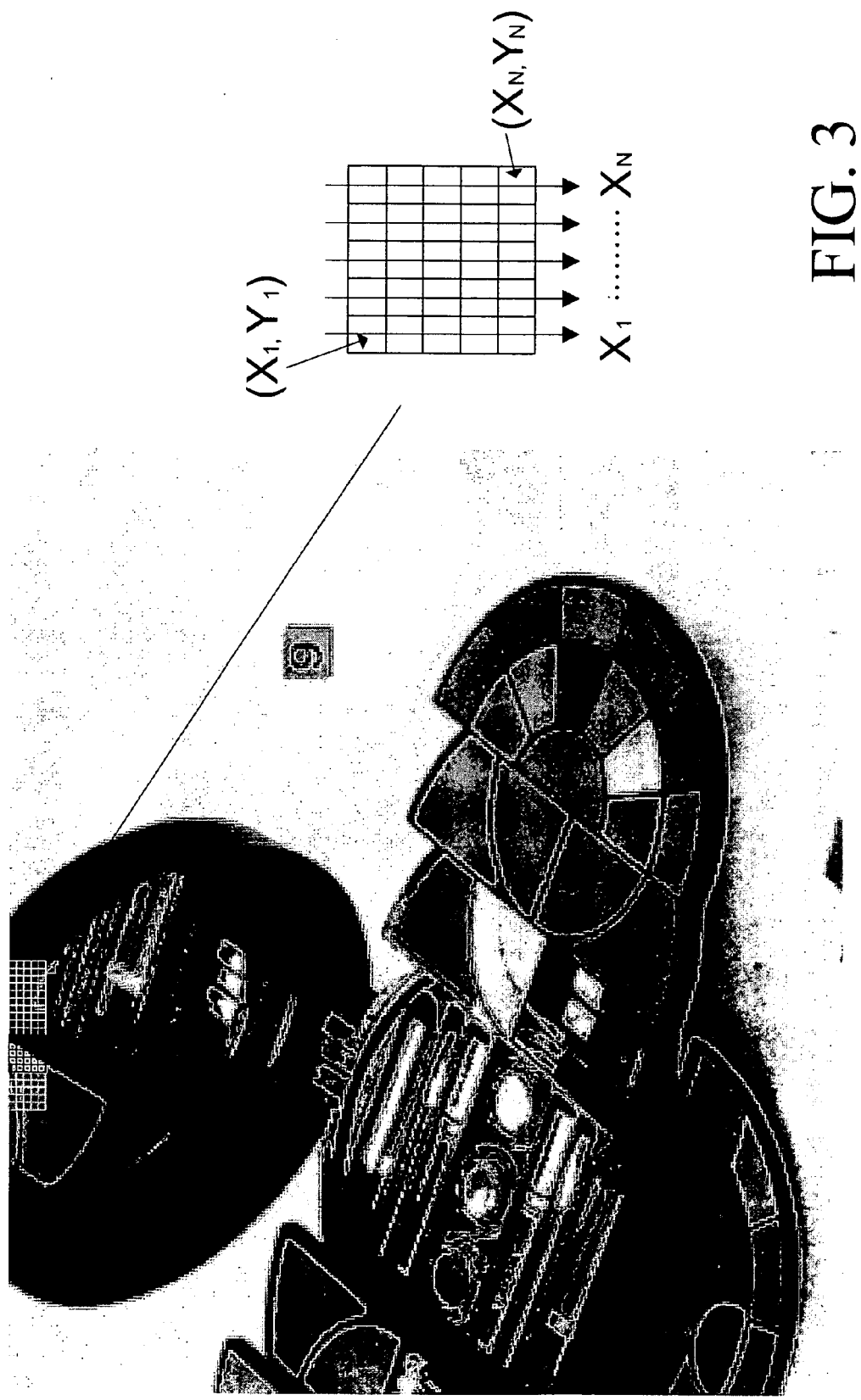
FIG. 3 is a schematic view of processing the operating matrix in the X direction.
Figure 4:
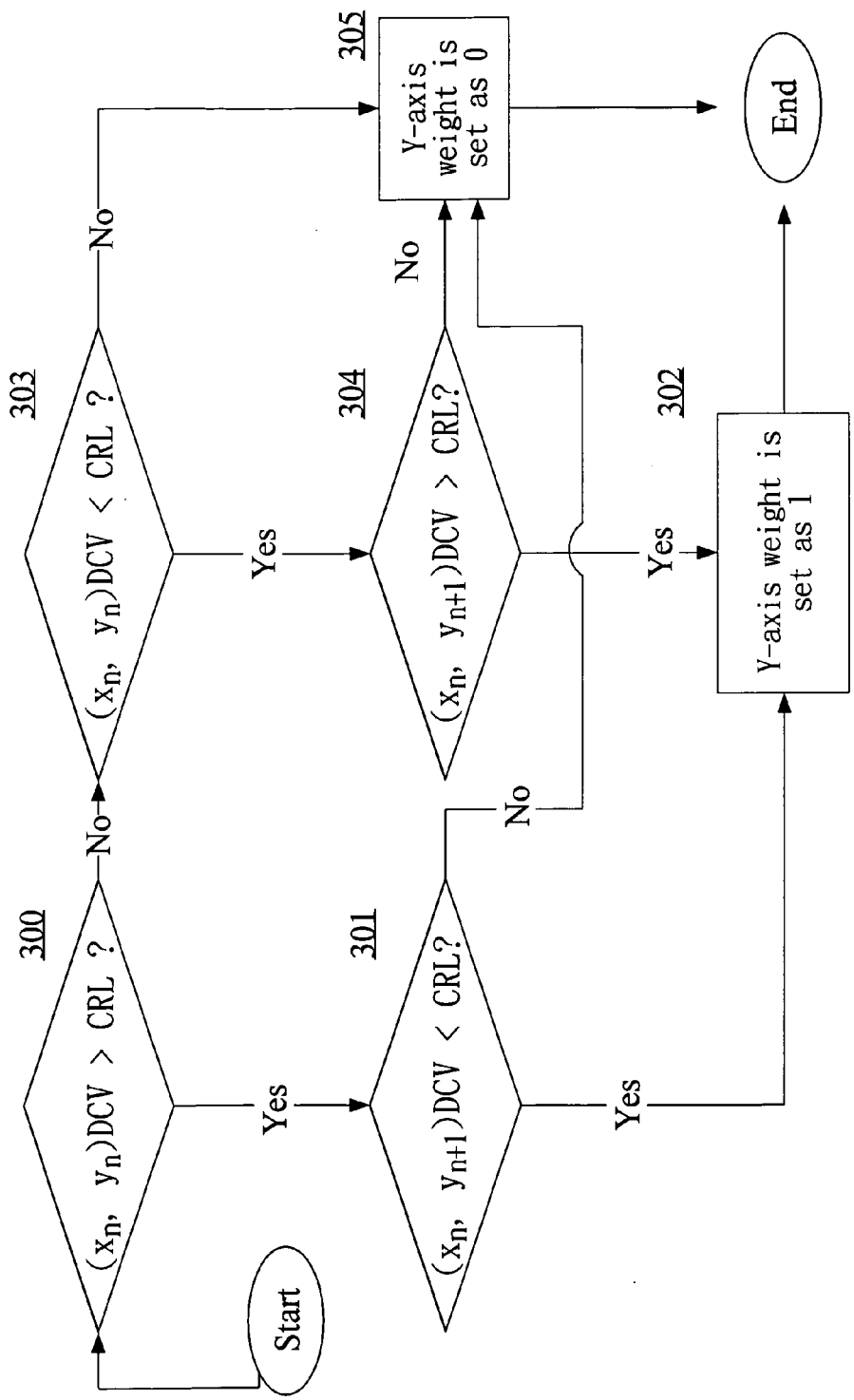
FIG. 4 is a flowchart of the Y-axis comparison analysis in the disclosed method.
Figure 5:
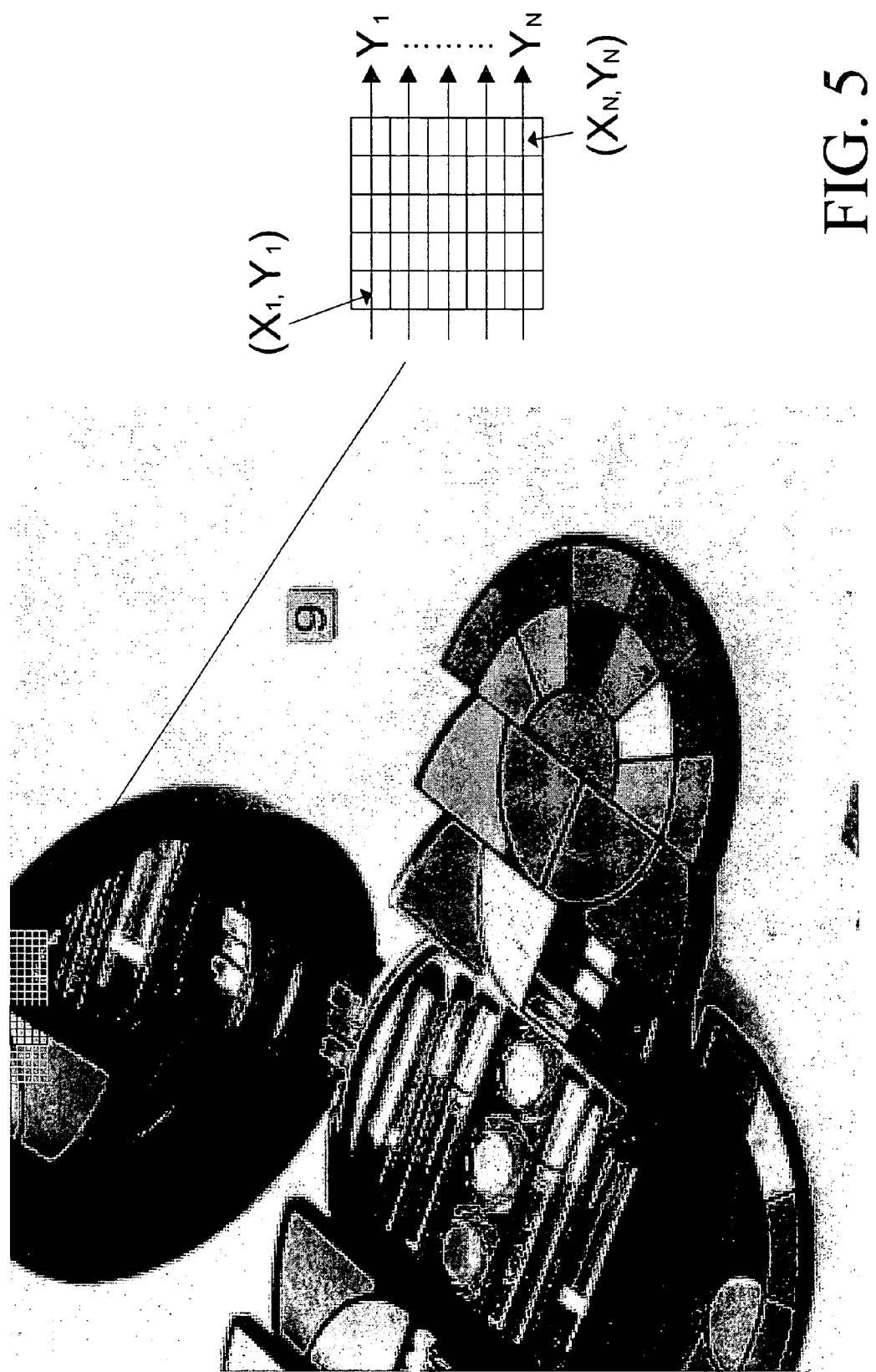
FIG. 5 is a schematic view of processing the operating matrix in the Y direction.

We first explain the comparison analysis in the X direction. After step 102, the one adjacent pixel unit in the X direction is compared with the default CRL (step 103). The operating matrix is given an X-axis weight after the comparison analysis (step 104). The detailed process in step 103 is shown in FIGS. 2 and 3. First, the method determines whether the (Xn, Yn) pixel unit in the operating matrix is greater than the default CRL (step 200). If so, then the method checks whether its one adjacent pixel unit in the X direction, i.e. the (Xn+1, Yn) pixel unit, are smaller than the default CRL (step 201). If this is also true, then the X-axis weight is set as 1 (step 202). Otherwise, the X-axis weight is set as 0 (step 205).

Back to step 200, if the answer is no in the determination, then the method checks whether the (Xn, Yn) pixel unit is smaller than the default CRL (step 203). If not, then the X-axis weight is set as 0 (step 205). Otherwise, the method further determines whether its one adjacent pixel unit, i.e. the (Xn+1, Yn) pixel unit, in the operating matrix along the X direction is greater than the default CRL (step 204). If true, then the X-axis weight is set as 1 (step 202). Otherwise, the X-axis weight is set as 0 (step 205).

After step 104, the method performs a comparison analysis for adjacent pixel units in the Y direction (step 105) and gives the operating matrix a Y-axis weight afterwards (step 106). The details of step 105 are similar to those in step 103. We use FIGS. 4 and 5 to explain the details. First, the method determines whether the (Xn, Yn) pixel unit in the operating matrix is greater than the default CRL (step 300). If true, then the method checks whether its one adjacent pixel unit in the Y direction, i.e. the (Xn, Yn+1) pixel unit, are smaller than the default CRL (step 301). If this is also true, then the Y-axis weight is set as 1 (step 302). Otherwise, the Y-axis weight is set as 0 (step 305).

Back to step 300, if the answer is no in the determination, then the method checks whether the (Xn, Yn) pixel unit is smaller than the default CRL (step 303). If not, then the Y-axis weight is set as 0 (step 305). Otherwise, the method further determines whether its one adjacent pixel unit, i.e. the (Xn, Yn+1) pixel unit, in the operating matrix along the Y direction is greater than the default CRL (step 304). If true, then the Y-axis weight is set as 1 (step 302). Otherwise, the Y-axis weight is set as 0 (step 305).

After returning to step 106, the X-axis weight and the Y-axis weight of the operating matrix from steps 104 and 106 are added together to give a weighted statistical value (step 107). A separating reference level (SRL) is used to determine whether a weight statistical value is smaller than it (step 108). When the weight statistical value is smaller than the SRL, the operating matrix is defined as text data (step 110); otherwise, the operating matrix is defined as graph data (step 109). For the convenience of subsequent processes, the operating matrix may contain an operation attribute. When the operating matrix is defined as text data, the operation attribute is set as false; whereas when the operating matrix is defined as graph data, the operation attribute is set as true.

Figure 6:
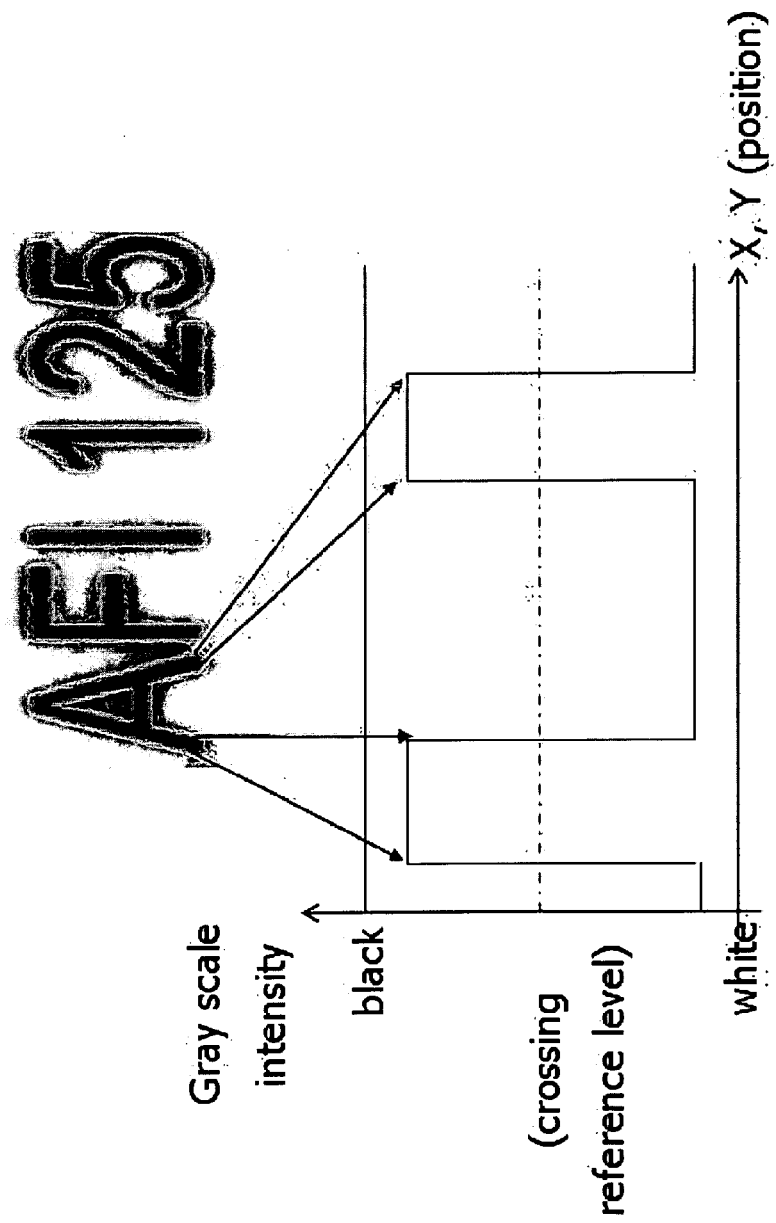
FIG. 6 is a schematic view showing the variation of the gray level of text data according to the disclosed method.
Figure 7:
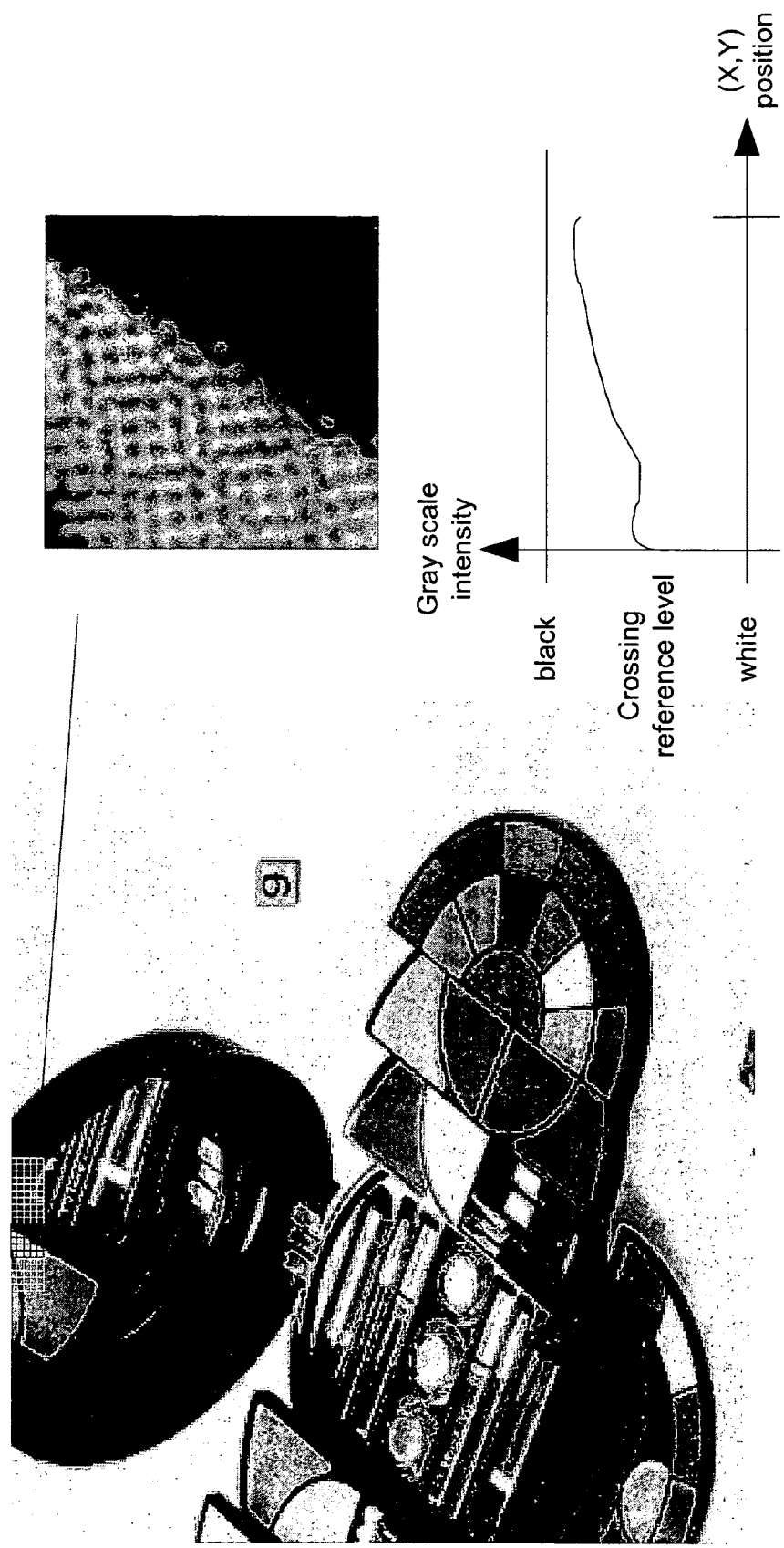
FIG. 7 is a schematic view showing the variation of the gray level of graph data according to the disclosed method.

Please refer to FIGS. 6 and 7. Judged by human eyes, the operating matrix in FIG. 6 falls right in text data while that in FIG. 7 falls in the graph data. Taking the level of gray of a digital image as an example, we see that the gray-level curve of the text data in FIG. 6 has fewer peaks. In FIG. 7, the gray-level curve of the graph data has more peaks. Therefore, each operating matrix can be accurately categorized using the disclosed graph-text separation method, thereby separating the text data and the graph data.

Certain variations would be apparent to those skilled in the art, which variations are considered within the spirit and scope of the claimed invention.

What is claimed is:

1. A method of separating graphs and text in digital image data for separating a plurality of graph data from a plurality of text data contained in a digital image, the method comprising the steps of:

reading the digital image data;

partitioning the digital image data into a plurality of operating matrices according to a default separating parameter, each of the operating matrices consisting of a plurality of pixel units each of which contains a digital characteristic value;

setting a default crossing reference level (CRL); and for each of the operating matrices performing the following steps:

performing a comparison analysis, which compares each of a plurality of pairs of adjacent pixel units in the operating matrix according to the default CRL and the operating matrix is given a weight when the digital characteristic value of the a first one of the adjacent pixel units is greater than the default CRL and the digital characteristic value of a second one of the adjacent pixel units is smaller than the CRL, and the operating matrix is given the weight when the digital characteristic value of the first adjacent pixel unit is smaller than the CRL and the digital characteristic value of the second adjacent pixel unit is greater than the CRL, adding up the weights of the operating matrices to obtain a weighted statistical value, and defining the operating matrix as text data when the weighted statistical value is smaller than a separating reference level (SRL) and as graph data when the weighted statistical value is greater than the SRL.

2. The method of claim 1, wherein the step of performing a comparison analysis is done for two adjacent pixel units in the X direction.

3. The method of claim 1, wherein the step of performing a comparison analysis is done for two adjacent pixel units in the Y direction.

4. The method of claim 1, wherein the operating matrix consists of N×N pixel units, each of which contains a set of coordinates.

5. The method of claim 4, wherein the coordinates consist of an X-axis coordinate value and a Y-axis coordinate value.

6. The method of claim 1, wherein the operating matrix contains an operation attribute.

7. The method of claim 6, wherein the operation attribute is set as false when the operating matrix contains text data.

8. The method of claim 6, wherein the operation attribute is set as true when the operating matrix contains graph data.

* * * * *